United States Patent Office 2,755,679
Patented July 24, 1956

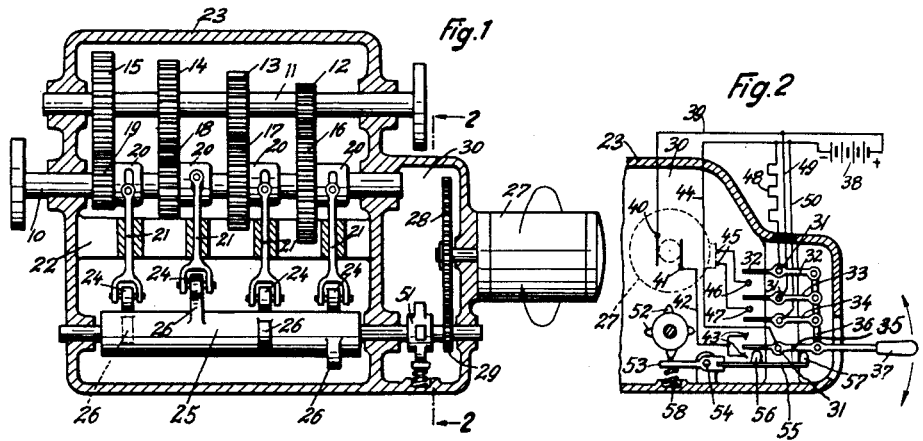

2,755,679

CONTROLLING MEANS FOR A SPEED CHANGE TRANSMISSION

Friedrich K. H. Nallinger, Stuttgart, Germany, assignor to Daimler-Benz Aktiengesellschaft, Stuttgart-Unterturkheim, Germany Application November 18, 1952, Serial No. 321,085

14 Claims. (Cl. 74—365)

My invention relates to controlling means for a speed change transmission and, more particularly, to a control system in which an electric motor drives a selector cam shaft adapted to set a speed change transmission selectively to any one of a plurality of ratios of transmission. Such systems are employed in motor vehicles in which the speed change transmission transfers power from the driving engine to the wheels.

When a speed change transmission including a plurality of friction clutches is shifted from one speed to another by the disengagement of one clutch and the engagement of another, it is desirable to so time the actuation of the clutches that within the interval lapsing upon the disengagement of the one clutch before the other clutch is engaged, the clutch elements of said other clutch can be either accelerated or slowed down so as to more or less synchronize them. Otherwise a shock will be caused incidental to the engagement of said other clutch.

Prior systems of the character indicated failed to comply with such requirement and, therefore, did not permit of a smooth operation. In such prior systems the selector cam shaft was driven in one direction of rotation at the same speed as in the other direction of rotation. When such speed was so chosen as to result in a smooth gear-shifting operation shifting the transmission to consecutively higher ratios, it was found that considerable shocks occurred upon the gear-shifting operation in the opposite sense, i. e. when the transmission was shifted to consecutively lower ratios.

It is the object of the present invention to provide an electrically driven gear-shifting mechanism in which a smooth operation free from shocks is ensured, no matter whether the transmission is shifted to a higher ratio or to a lower ratio.

Further objects of the invention are to provide a control system of the character indicated which is simple in structure and reliable in operation and can be easily controlled by the driver of a motor vehicle. These and other objects which will appear from a detailed description of a number of preferred embodiments of the invention following hereinafter are attained by an electric drive adapted to operate the selector at a higher rate of speed in one direction than in the opposite direction, whereby the gear-shifting operation can be so timed as to guarantee a smooth operation free from shocks.

In the accompanying drawings a number of preferred embodiments of the invention are illustrated and will be described hereinafter in detail, it being understood that such description serves the purpose of explanation rather than that of limitation of the invention, the scope of the latter being defined in the accompanying claims.

In the drawings,

Fig. 1 is a section through the transmission equipped with the selector and the electric drive therefor;

Fig. 2 is a cross section of the transmission taken along line 2—2 of Fig. 1 and includes the circuit diagram of the electric drive;

Fig. 3 is a circuit diagram of a modified electric drive that can be incorporated in the transmission shown in Fig. 1;

Fig. 4 is a third modification of the electric drive to be used in connection with the transmission of Fig. 1;

Fig. 5 illustrates another embodiment of the invention by way of a partial sectional view of the transmission;

Fig. 6 is a partial section taken along line 6—6 of Fig. 5 including the circuit diagram of the controller; and Fig. 7 is another modification of the circuit diagram of the controller to be used in connection with the transmission shown in Figs. 1 and 2.

The transmission shown in Fig. 1 comprises a drive shaft 10 driven by the engine of a motor vehicle, a driven shaft 11 geared to the wheels of the vehicle, and four pairs of meshing gears, each pair comprising a gear 12, 13, 14, and 15 respectively, fixed to the driven shaft 11 and gears 16, 17, 18, and 19 respectively, freely rotatably mounted on the drive shaft 10 each adapted to be clutched thereto for common rotation therewith by a friction clutch, for instance of the multi-disk type, diagrammatically indicated at 20. Each of the friction clutches is adapted to be engaged by upward motion and disengaged by downward motion of an actuating rod 21. Since such clutches and the means for actuating same are well known in the art, a detailed disclosure thereof is deemed dispensable herewith. Each of the actuating rods 21 is slidably guided in a guideway provided by a web or rib 22 of the housing 23 in which the two shafts 10 and 11 are journalled in parallel relationship. The remote ends of the actuating rods 21 are fork-shaped straddling follower rollers 24 suitably journalled therein. The followers 24 are held by suitable springs not shown in engagement with a cam shaft 25 provided with cams 26 individually coordinated to the followers and adapted to actuate same. The cams 26 are displaced in angular relationship and are adapted, when the cam shaft 25 rotates continuously in one direction, to cause the followers 24 to intermittently set the transmission to consecutively higher ratios and, when the cam shaft is continuously rotated in the opposite direction, to cause the followers 24 to intermittently set the transmission to consecutively lower ratios.

An electric drive is provided to move the selector constituted by the cam shaft 25. In the present invention a reversible electric motor 27 serves such purpose, same being mounted on the outside of casing 23, the motor shaft extending therethrough and carrying a gear 28 fixed to its front end. The gear meshes with a gear 29 fixed to the cam shaft 25. When the parts assume the position shown in Fig. 1, all of the clutches are disengaged except for the clutch 20 coordinated to gear 18 which is kept in engaged condition by the associated follower. When the armature of the electric motor 27 revolves in the direction illustrated by the arrow in Fig. 1, it will cause the selector cam shaft 25 to disengage the clutch associated with gear 18 and, after a certain period of time has elapsed, to engage the clutch associated with gear 19 whereby a higher ratio of transmission will be set up, the pair of gears 15, 19 having a higher ratio of transmission than the pair of gears 14, 18. When the motor 27 is started in a direction opposite to that indicated by the arrow, the selector cam shaft 25 will disengage the clutch of gear 18 and will then, after a certain interval of time, engage the clutch of gear 17 thereby shifting the transmission to a lower ratio of transmission. In either case it is desirable that in the interval after the friction clutch of gear 18 has been disengaged the engine should have time to so accelerate or decelerate the drive shaft 10 as to synchronize the members of the next clutch to be engaged. Since the rate of acceleration attainable by the engine differs from the rate of deceleration, such a synchronization requires that the lengths of the intervals be different depending on whether the transmission is shifted to higher gears or to lower gears. Therefore, I have provided means which will vary the speed of the selector 25 when the same is reversed.

Preferably, such means comprise a controller which is illustrated in Fig. 2. The controller includes a plurality of superimposed horizontal parallel shafts 31 which are mounted within a chamber 30 of the transmission casing 23 and extend parallel to the axis of the selector cam shaft 25. Two-armed levers 32, 33, 34 and 35 are mounted on the shafts 31 in parallel relationship and are connected by links 36 for common pivotal motion. The lowermost lever is provided with any suitable means for actuation. In the present embodiment, such means comprise a handle 37, but it is to be clearly understood that other than manually operable means may be used for the actuation of the controller. The right arm of the lever 35 is extended through an opening in the wall of compartment 30 and carries the handle 37. It is to be understood, of course, that such handle may be disposed at any convenient location within the motor vehicle and connected by a suitable linkage with the lever 35.

The positive terminal of a suitable source of current indicated at 38 which may be the battery of the motor vehicle is connected by a wire 39 to one terminal 40 of the armature of the D. C. motor 27, while the other terminal 41 of the armature is connected by a wire 42 to a pair of spaced contacts 43 which may be engaged by the lever 35, but normally are out of contact therewith. The lever 35 is suitably insulated from its shaft 31 and from the link 36 and is electrically connected with a wire 44 which leads to the negative terminal of the battery. Therefore, when the controller lever 35 assumes the horizontal position shown in Fig. 4, the motor 27 is de-energized. When the handle 37, however, is lifted or depressed, it will close an electrical circuit extending from the source of current 38 through the armature of the electric motor, whereby the same will be started. The speed of operation of the electric motor depends in a well known manner on the energization of the field windings. The terminals of the field windings are indicated at 45 and are connected by wires to a pair of contacts 46 and 47 which are disposed for alternative engagement with the left hand arms of the three levers 32, 33, 34, each of which is electrically insulated from its shaft and from the link 36 and is electrically connected with a suitable wire. Thus, lever 32 is connected through a resistance 48 and the wire 44 with the negative terminal of the battery. Lever 33 is connected by a wire 49 and the wire 39 to the positive terminal of the battery, and lever 34 is connected by a wire 50 and wire 44 to the negative terminal of the battery. When the handle 37 is depressed, the left hand arms of the controller levers will be lifted. Lever 34 will engage contact 47 and lever 33 will engage contact 46, whereby the upper terminal 45 will be connected with the positive terminal of the battery, while the lower terminal 45 will be connected with the negative terminal of the battery. The field windings will be fully energized and the motor will rotate in the direction of the arrow shown in Fig. 1 at a comparatively low speed. When the handle 37 is lifted, however, lever 34 will remain idle and the levers 31 and 32 will close a circuit extending from the negative terminal of the battery through wire 44, resistance 48, lever 32, contact 46, upper terminal 45, field windings of motor 27, lower terminal 45, contact 47, lever 33, wire 49, wire 39 to the positive terminal of battery 38. Within this circuit the field windings will be energized. However, the degree of energization will be reduced by the inclusion in the circuit of the resistance 48. As a result, the motor 27 will revolve at a higher speed. Also it will be noted that the energization of the field windings takes place in the opposite sense causing motor 27 to run in a direction opposite to the arrow shown in Fig. 1.

Preferably, means are provided which are operable by the selector 25 and are adapted to stop the electric drive whenever the transmission has been set to the following ratio of transmission. In the present embodiment, such means comprise a cam 51 mounted on the shaft of the selector cam 25 and having four lobes 52. Whenever the selector is in a position in which it lifts one of the followers 24, one of the lobes 52 will depress a spring-controlled arm 53 which is mounted beneath cam 51 for pivotal motion about a horizontal axis 54. A leaf spring 55 is fixed to the hub of arm 53 and has two buttons 56 and 57 which in their upper positions will engage the arms of lever 35. In Fig. 2 the parts are shown in the position in which the transmission is set to the second ratio, the gears 18 and 14 being operative to transmit the power. When the transmission is to be set to the first ratio causing gears 19 and 15 to transmit the power, the handle 37 must be depressed which, as described, causes motor 27 to rotate in the direction of the arrow shown in Fig. 1. As a result, cam 26 will disengage the associated clutch coordinated to the pair of gears 18, 14 and the arm 53 will be released by the associated lobe 52 and permitted to rise under the effect of the spring 58. Therefore, the buttons 56 and 57 will be lowered permitting the operator to now release handle 37 which will stay in its lower position. After a certain interval of time determined by the speed of motor 27 and by the angular spacing of the cams 26, the follower associated to the pair of gears 15, 19 will be actuated and, at the same time, the next lobe 52 will again move the parts to the position shown in Fig. 2 thereby stopping motor 27 until same will be again actuated by suitable manipulation of handle 37.

From the foregoing description it will appear that the electric drive constituted by the motor 27 and the controller composed of levers 32, 33, 34, 35, of the associated contacts, and of the resistance 48 will move the selector 25 in one direction at a higher speed and in the opposite direction at a lower speed, such speeds being so chosen as to result in a smooth gear-shifting operation free from shocks.

The embodiment of the invention described hereinabove with reference to Figs. 1 and 2 is capable of numerous modifications. Thus, I have illustrated modified controllers in Figs. 3 and 4.

In the embodiment shown in Fig. 3, each of the two energizing windings of the D. C. motor is composed of two sections 58, 59, and 60, 61 respectively. The two windings are connected in series by a wire 62. A wire 63 connects winding 58 to a contact 64, while winding section 61 is connected by wire 65 to a contact 66. The winding 58, 59 is tapped in the middle and the tap is connected to a resistance 67 which, in its turn, is connected by a wire 68 to a contact 69. Similarly, the field winding 60, 61 is tapped in its middle and the tapping point is connected to a resistance 70 which by wire 71 is connected to a contact 72. The contacts 66 and 69 can be alternatively engaged by a switch arm 73. Similarly, the contacts 64 and 72 are adapted to be alternatively engaged by a switch arm 74. The two arms 73 and 74 are connected from common pivotal movement by a link 75 and are equipped with a handle 76 for manipulation. The two arms 73 and 74 are insulated from each other and are individually connected by wires 77 to the source of current 78. The armature of the electric motor 127 is connected to the source of current 78 by wires 79. The resistances 67 and 70 have about the same ohmic value as the winding sections 58 and 61.

The operation is as follows:

When the switch is in the position shown in Fig. 3 in full lines, current will flow from the positive terminal of the battery through the associated wires 79 and 77, the arm 73, contact 66, wire 65, winding sections 61 and 60, wire 62, winding sections 59 and 58, wire 63, contact 64, arm 74, and the wires 77 and 79 coordinated to the negative terminal of the battery 78. As a result, a powerful field will be produced and, therefore, the electric motor 127 will rotate at a comparatively slow number of revolutions driving the selector 25 in a sense causing it to shift the tarnsmission to lower speeds.

When the handle 76 is shifted to its upper position, it will establish a circuit extending from the positive terminal of the battery 78 and the associated wires 79 and 77 to arm 73, contact 69, wire 68, resistance 67, winding section 59, wire 62, wire 52, winding section 60, resistance 70, wire 71, contact 72, switch arm 74, and the associated wires 77 and 79 to the negative terminal of the battery 78. However, the sections 58 and 61 of the field windings will remain de-energized. Since the current will be substantially the same as before, a smaller flux will be produced because of the smaller number of windings energized whereby the motor will be caused to rotate at a higher speed. At the same time, the flow of current through the field windings has been reversed so that the electric motor 127 will be driven in the opposite direction causing the selector 25 to shift the transmission to higher speeds.

In the embodiment of the invention illustrated in Fig. 4 the battery is tapped thus providing for a positive low-voltage terminal 80 and for a positive high-voltage terminal 81. The flux of the field of the electric motor 27 is controlled by alternative connection of the field by the two-pole switch 82 to one or the other of the two terminals 80 and 81. When the switch assumes the position shown in full lines, a circuit is closed from the high-voltage terminal 81 through wires 83 and 84, the lower switch arm 85 of switch 82, wire 86, field winding 87, wire 88, field winding 89, wire 90, upper arm 91 of the two-pole switch 82, wire 92, and wire 93 to the negative terminal of the battery. The motor will be fully energized and will accordingly run at a comparatively low number of revolutions. When the switch 82 is shifted to the upper position indicated in dotted lines, the following circiut will be established: From the low-voltage terminal 80 through wire 93, switch arm 91, wire 90, winding 89, wire 88, winding 87, wire 86, arm 85, wires 92 and 93, negative terminal of the battery. As a result, the motor will be reversed and rotate at a higher speed because of the smaller flux produced by the field windings.

In the embodiment illustrated in Figs. 5 and 6, an electric motor 95 has been provided which continuously revolves in the same direction and is cooperatively connected with the shaft of the selector 25 through the intermediary of a reversing gear 96 of any suitable design capable of being shifted by means of a lever 97 indicated in dotted lines. The controller resembles that illustrated in Fig. 2. However, a pair of electromagnets 98 and 99 is provided to shift the arm 97 of the reversing gear. The circuit diagram will be best understood from a description of the operation. In the position shown the electric motor 95 and the selector geared thereto are at rest, the transmission being set to one of its ratios of transmission. When the operator wishes to increase the speed of the driven shaft 11 with respect to that of the drive shaft 10, he will shift handle 137 in downward direction thereby establishing a circuit extending from the positive terminal of the battery 138 through 139, terminal 140, the armature of motor 95, terminal 141, wire 142, contact 143, lever 134, and wire 150 to the negative terminal of the battery. Another circuit will be established from the positive terminal of the battery through wire 139, wire 100, lever 132, terminal 101, wire 102, winding of electromagnet 98, wire 103, arm 133, and wire 150 to the negative terminal of the battery. As a result, the switch arm 97 will be held in the position shown in Fig. 6.

When the operator wishes to reduce the speed of the driven shaft 11, he will lift handle 137 thereby establishing the following circuit for the armature of the electric motor: Positive terminal of the battery 138, wire 139, terminal 140, armature of the electric motor, terminal 141, wire 142, resistance 104, arm 134, wire 150, negative terminal of the battery. As a result, the motor will will revolve at a slower speed. The field windings are shunted across the armature and are so chosen that substantially the maximum flux will be produced, even when the resistance 104 is placed in series with the motor.

Moreover, with handle 137 in its upper position, the electromagnet 99 will be energized in a circuit extending from the positive terminal of the battery through the elements 139, 100, 132, 103, 99, 105, 133, 150. Therefore, the selector 25 will be reversed.

In the embodiment shown in Fig. 7 the field windings 106, 107, are placed in series with the armature 108. In the position shown in full lines the bipolar switch adapted to be actuated by the handle 276 assumes the position in which it causes the selector to shift the transmission for higher speeds of the driven shaft 11. In this position, the resistance 106 is in-operative. When the handle 276 is lifted, the switch arms 173 and 174 are brought to the position indicated by dotted lines causing the current to flow through the armature 108 in the opposite direction and through the resistance 106, whereby the motor will be reversed and the speed thereof will be reduced Anyone skilled in the art may readily devise other electric drives adapted to rotate the selector 25 in opposite directions at different speeds.

While I have described my invention with reference to a number of specific embodiments thereof, I wish it to be clearly understood that the invention is in no way limited to the details of such embodiments, but is capable of numerous modifications within the scope of the appended claims.

What I claim is:

1. In a mechanism of the character described, a speed change transmission adapted to be selectively set to a plurality of ratios of transmission, a movable selector coordinated to said transmission and adapted on movement in one direction to set same to consecutively higher ratios and on movement in the opposite direction to set same to consecutively lower ratios, an electric drive means for moving said selector in said first mentioned direction at a certain speed and in said opposite direction at a speed higher than said certain speed, and a controller including electrically controlled variable speed means for said electric drive means.

2. In a mechanism of the character described, a speed change transmission adapted to be set to a plurality of ratios of transmission, movable means coordinated with said transmission and adapted to selectively set the same to any one of said ratios, a rotary selector coordinated with said movable means and adapted upon continued rotation in one direction to cause same to intermittently set said transmission to consecutively higher ratios and adapted upon continued rotation in the opposite direction to cause same to intermittently set said transmission to consecutively lower ratios, an electric motor adapted to impart rotation to said rotary selector, and a controller including electrically controlled variable speed means coordinated with said motor and adapted to determine the direction and speed of said rotation and to assume either one of two positions being operative in one position to cause said motor to drive said selector in said first mentioned direction at a certain speed and being operative in the other one of said positions to cause said motor to drive said selector in said opposite direction at a speed higher than said certain speed.

3. In a mechanism of the character described, a speed change transmission including a plurality of friction clutches and adapted by selective actuation thereof to be set to a plurality of ratios of transmission, a rotary selector cam shaft having a plurality of cams, followers individually coordinated with said cams and adapted to be actuated thereby and to actuate said friction clutches, said cam shaft being adapted upon continued rotation in one direction to cause said followers to intermittently set said transmission to consecutively higher ratios and adapted upon continued rotation in the opposite direction to cause said followers to intermittently set said transmission to consecutively lower ratios, an electric motor adapted to impart rotation to said selector cam shaft, and a manually operable control means connected with said motor to determine the direction and speed of said rotation, said control means having two positions and being operative in one position to cause said motor to drive said selector cam shaft in said first mentioned direction at a certain speed and being operative in the other one of said positions to cause said motor to drive said selector cam shaft in said opposite direction at a speed higher than said certain speed.

4. In a mechanism of the character described, a speed change transmission adapted to be selectively set to a plurality of ratios of transmission, a movable selector coordinated with said transmission and adatped on movement in one direction to set said selector to consecutively higher ratios and on movement in the opposite direction to set said selector to consecutively lower ratios, an electric drive means for alternately moving said selector either in said first mentioned direction at a certain speed or in said opposite direction at a speed higher than said certain speed, manually operable means adapted to start said electric drive in either of said directions, and means operable by said selector and adapted to stop said electric drive whenever the transmission has been set to the following ratio of transmission.

5. The combination claimed in claim 2 in which said electric motor is a D. C. motor having field windings, said controller including a resistance and being adapted, when assuming said other one of said positions, to place said resistance in series with said field windings.

6. The combination claimed in claim 2 in which a battery having a high-voltage terminal and a low-voltage terminal is provided, said controller being adapted, when assuming said one position, to connect said motor to said low-voltage terminal and, when assuming said other one of said positions, to connect said motor to said high-voltage terminal.

7. The combination claimed in claim 2 in which said electric motor is a D. C. motor having a plurality of field windings, said controller including contacts adapted, when the controller assumes said one position, to energize all of said field windings and adapted, when said controller assumes said other one of said positions, to energize but part of said field windings.

8. In a mechanism of the character described, a change speed transmission adapted to be selectively set to a plurality of transmission ratios, a movable selector means coordinated with said transmission to set said transmission to consecutively higher ratios upon movement in one direction and to set said transmission to consecutively lower ratios upon movement in the opposite direction, an electric drive means for moving said selector means in said first-mentioned direction at a predetermined speed and in said opposite direction at a speed higher than said predetermined speed, and a controller for said electric drive means, said electric drive means including a D. C. motor having field windings, and said controller including a resistance placed in series with said field windings with said controller in a position to operate said drive means at said higher speed.

9. In a mechanism of the character described, a speed change transmission adapted to be selectively set to a plurality of transmission ratios, movable selector means coordinated with said transmission for setting said transmission to consecutively higher ratios on movement in one direction and for setting said transmission to consecutively lower ratios on movement in the opposite direction, an electric drive means for moving said selector means in said first-mentioned direction at a predetermined speed and in said opposite direction at a speed higher than said predetermined speed, a two-position controller for said electric drive means, a battery having a high voltage terminal and a low voltage terminal, and means for connecting said electric drive means to said low voltage terminal with said controller in one position and to said high voltage terminal with said controller in another position.

10. In a mechanism of the character described, a speed change transmission adapted to be selectively set to a plurality of transmission ratios, movable selector means coordinated with said transmission for setting said transmission to consecutively higher ratios upon movement in one direction and for setting said transmission to consecutively lower ratios upon movement in the opposite direction, an electric drive means for moving said selector means in said first-mentioned direction at a predetermined speed and in said opposite direction at a speed higher than said predetermined speed, and a controller for said electric drive means, said electric drive means including a D. C. motor having a plurality of field windings, and said controller including contact means for energizing all of said field windings with said controller in one position and for energizing only a part of said field windings with said controller in another position.

11. Control apparatus for a change speed transmission having a plurality of transmission ratios comprising means for individually engaging the different transmission ratios of said transmission, means for actuating said engaging means, and two-speed control means for controlling said actuating means for operation thereof at a first predetermined speed in one direction to increase the transmission ratio of said transmission and for operation thereof at another predetermined speed different from said first speed in the opposite direction to decrease the transmission ratio of said transmission.

12. Control apparatus for a change speed transmission having a plurality of transmission ratios comprising means for individually engaging the different ratios of said transmission, means including a reversible electric motor for actuating said engaging means, and two-speed control means for electrically controlling said actuating means for operation thereof at a first predetermined speed in one direction to increase the transmission ratio of said transmission and for operation thereof at another predetermined speed different from said first speed in the opposite direction to decrease the transmission ratio of said transmission.

13. Control apparatus according to claim 12, further comprising stop means for automatically limiting the operation of said actuating means for engagement of only the next adjacent speed ratio of said transmission with each operation of said control means.

14. Control apparatus according to claim 13 wherein said control means includes a two-position switch and electric circuit means for energizing said motor for rotation in one direction at said first speed in one position of said switch and for rotation in the opposite direction at said another speed in the other position of said switch.

References Cited in the file of this patent

UNITED STATES PATENTS

| | | |
|---|---|---|
| 1,262,350 | Johnson | Apr. 9, 1918 |
| 1,296,436 | Seaman | Mar. 4, 1919 |
| 1,386,388 | Wilkin | Aug. 2, 1921 |
| 1,791,593 | Hantschel | Feb. 10, 1931 |
| 1,984,556 | Vetter | Dec. 18, 1934 |
| 2,141,096 | Thurber | Dec. 20, 1938 |